United States Patent
Yamagishi et al.

(10) Patent No.: US 9,122,137 B2
(45) Date of Patent: Sep. 1, 2015

(54) HOUSING FOR PROJECTION DISPLAY DEVICE AND PROJECTION DISPLAY DEVICE INCLUDING HOUSING FOR PROJECTION DISPLAY DEVICE

(71) Applicant: Panasonic Corporation, Kadoma-shi, Osaka (JP)

(72) Inventors: Shigekazu Yamagishi, Osaka (JP); Masato Tanaka, Kyoto (JP); Shu Namba, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 14/095,473

(22) Filed: Dec. 3, 2013

(65) Prior Publication Data
US 2014/0160449 A1    Jun. 12, 2014

(30) Foreign Application Priority Data

Dec. 6, 2012 (JP) ................................. 2012-267140
Oct. 22, 2013 (JP) ................................. 2013-218858

(51) Int. Cl.
| | | |
|---|---|---|
| *G03B 21/14* | (2006.01) | |
| *G02B 27/00* | (2006.01) | |
| *G02B 7/02* | (2006.01) | |
| *G02B 26/00* | (2006.01) | |
| *G02B 27/10* | (2006.01) | |
| *G02B 27/14* | (2006.01) | |
| *G03B 5/04* | (2006.01) | |

(52) U.S. Cl.
CPC .............. *G03B 21/145* (2013.01); *G02B 7/022* (2013.01); *G02B 7/023* (2013.01); *G02B 27/0006* (2013.01); *G03B 21/142* (2013.01); *G02B 26/008* (2013.01); *G02B 27/1033* (2013.01); *G02B 27/141* (2013.01); *G03B 5/04* (2013.01)

(58) Field of Classification Search
CPC .... G03B 21/14; G03B 21/142; G03B 21/145; G03B 5/04; G02B 7/022; G02B 7/023; G02B 27/0006; H02B 1/28
USPC .................................. 359/507, 511, 513–514
See application file for complete search history.

(56) References Cited

U.S. PATENT DOCUMENTS

| | | | |
|---|---|---|---|
| 6,416,184 B1 * | 7/2002 | Arai et al. ........................ | 353/52 |
| 6,513,936 B1 * | 2/2003 | Ishiwa et al. .................... | 353/56 |
| 7,165,848 B2 * | 1/2007 | Gishi .............................. | 353/88 |
| 8,118,436 B2 * | 2/2012 | Oda et al. ....................... | 353/101 |
| 2004/0076106 A1 * | 4/2004 | Yamamoto et al. ......... | 369/112.1 |
| 2004/0165152 A1 * | 8/2004 | Ito et al. ............................ | 353/30 |
| 2009/0225214 A1 * | 9/2009 | Takizawa ...................... | 348/335 |
| 2012/0194919 A1 * | 8/2012 | Huang et al. ................... | 359/701 |

FOREIGN PATENT DOCUMENTS

| | | | | |
|---|---|---|---|---|
| JP | 09065261 A | * | 3/1997 | ............... H04N 5/74 |
| JP | 2004-205686 | | 7/2004 | |
| JP | 2010128135 A | * | 6/2010 | |

* cited by examiner

*Primary Examiner* — Jori S Reilly-Diakun
(74) *Attorney, Agent, or Firm* — Hamre, Schumann, Mueller & Larson, P.C.

(57) ABSTRACT

The shield includes: a first dust-proof wall that is shiftable integrally with the projection lens, and has width a1 projecting from the projection lens to an A side; and a second dust-proof wall that is slidable within a range regulated by the regulator, and has length b1 on the A side. When the second dust-proof wall has length c2 shiftable to a B side, the projection lens and the second dust-proof wall form a space having length d1 on the A side, and the projection lens and the frame form a space having length e1 on the A side, $a1 \geq d1$, $b1 \geq e1-d1$, and $b1+d1-e1 \geq c2$ are satisfied.

6 Claims, 6 Drawing Sheets

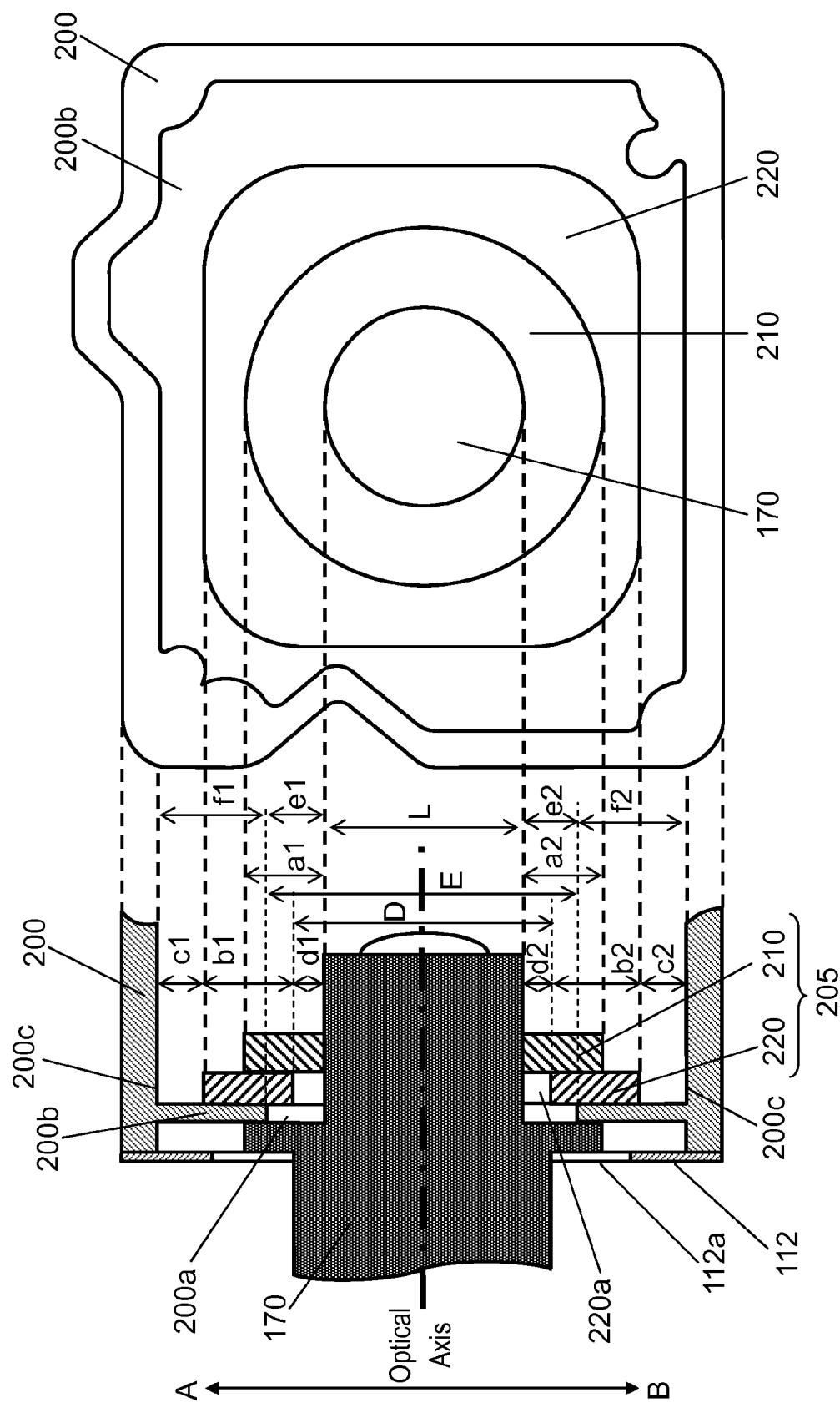

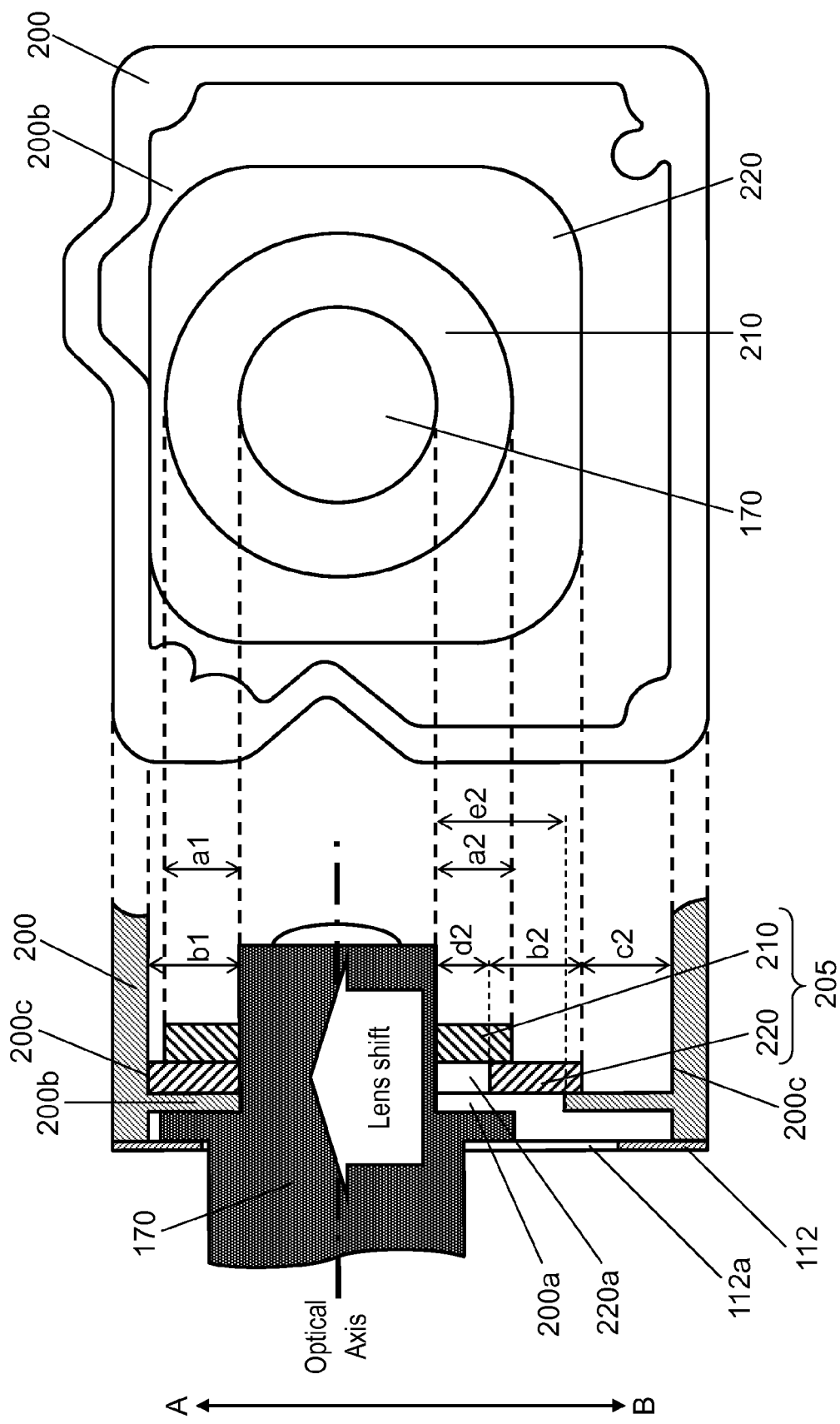

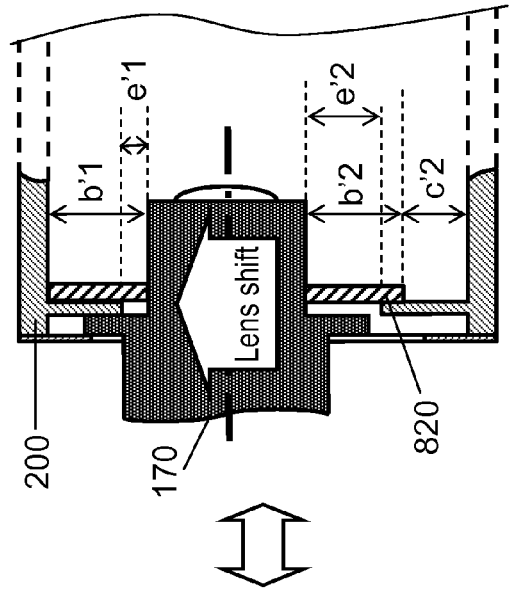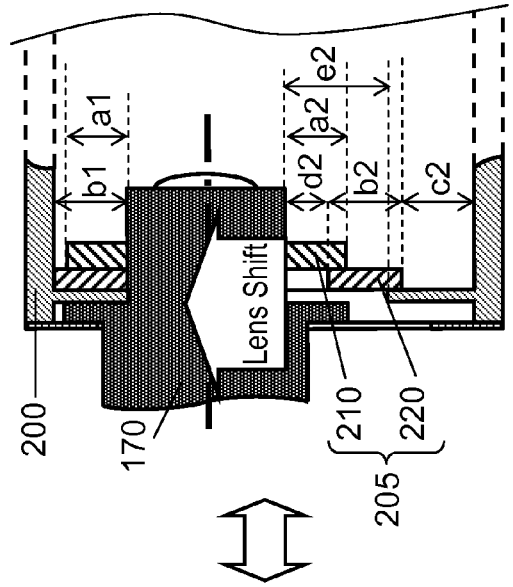
FIG. 5A
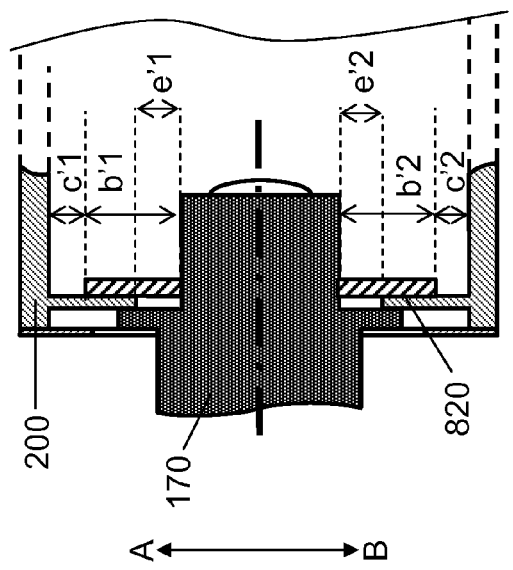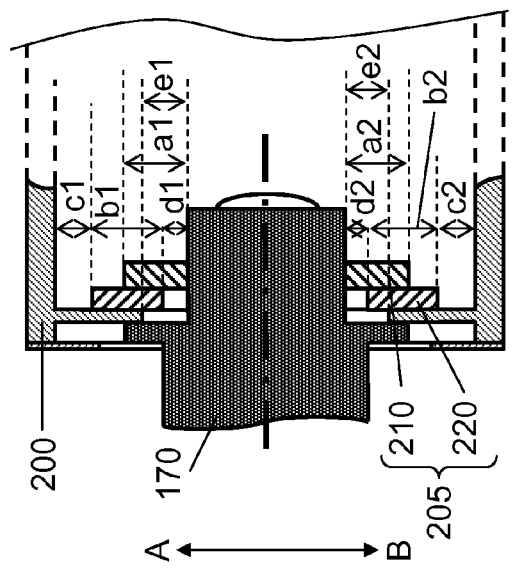
FIG. 5B

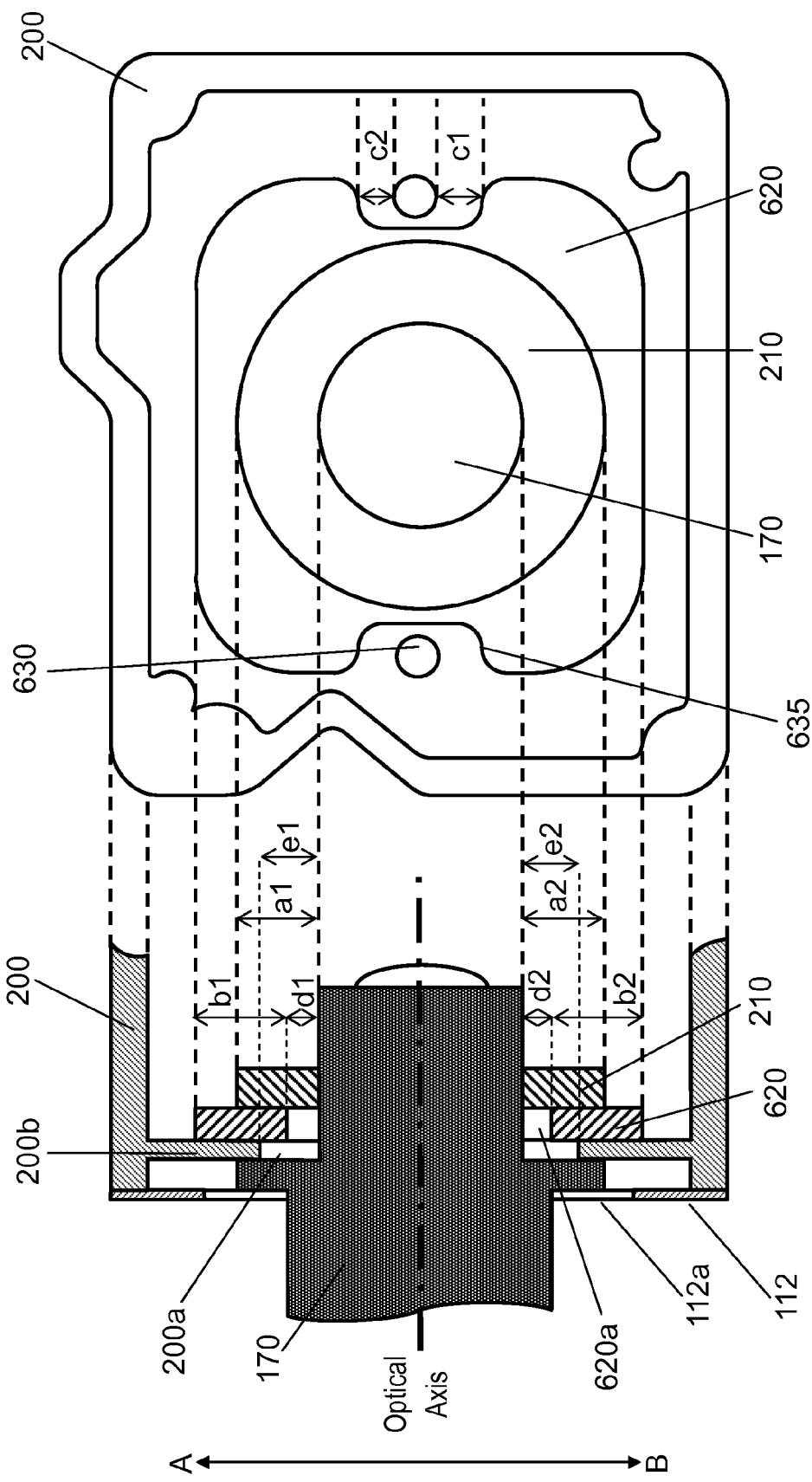

HOUSING FOR PROJECTION DISPLAY DEVICE AND PROJECTION DISPLAY DEVICE INCLUDING HOUSING FOR PROJECTION DISPLAY DEVICE

CROSS-REFERENCE TO RELATED APPLICATIONS

BACKGROUND

The present disclosure relates to a housing having a dust-proof structure and adapted for a projection display device, and a projection display device including the housing for a projection display device.

Unexamined Japanese Patent Publication No. 2004-205686 discloses a housing having a dust-proof structure and adapted for a projection display device. The housing for a projection display device includes a frame, a shiftable projection lens, and a shield. The shield has a first shield member, a second shield member, and a third shield member. The housing for a projection display device thus configured is capable of protecting the inside of the housing from dust.

SUMMARY OF THE DISCLOSURE

The present disclosure provides a housing for a projection display device, where the housing is relatively small in size and is capable of protecting the inside of the housing from dust.

The housing for a projection display device according to the present disclosure includes: a frame having an opening in which a projection lens is located so as to be shiftable in a first axis direction; a shield shiftable in the first axis direction with respect to the frame, for shielding the opening along with the projection lens; and a regulator for regulating shift of the shield. The shield includes: a first dust-proof wall that is located so as to be in contact with an outer periphery of the projection lens, is shiftable integrally with the projection lens, and has a first width projecting from the outer periphery of the projection lens to a first side in the first axis direction; and a second dust-proof wall that is located between the opening and the first dust-proof wall so as to have a space from the outer periphery of the projection lens, is slidable in the first axis direction within a range regulated by the regulator, and has a second width corresponding to a length of a portion on the first side. When the projection lens is located at a first position and the second dust-proof wall is located at a second position, assume that the second dust-proof wall has a third width corresponding to a length shiftable from the second position to a second side opposite to the first side with respect to the projection lens, a fourth width corresponding to a length of a portion on the first side in a space between the outer periphery of the projection lens and the second dust-proof wall, and a fifth width corresponding to a length of a portion on the first side in a space between the outer periphery of the projection lens and the frame. In this case, the first width is not less than the fourth width, the second width is not less than a length obtained by subtracting the fourth width from the fifth width, and a length obtained by subtracting the fifth width from a sum of the second width and the fourth width is not less than the third width.

The housing for a projection display device according to the present disclosure is relatively small in size and is capable of protecting the inside of the housing from dust.

BRIEF DESCRIPTION OF DRAWINGS

FIG. 3 is a view of the configuration around a projection lens of the projector according to the first exemplary embodiment;

FIG. 4 is a view of the configuration around the projection lens of the projector according to the first exemplary embodiment;

FIG. 5A is an explanatory view of the effects of the projector according to the first exemplary embodiment;

FIG. 5B is an explanatory view of the effect of the projector according to the first exemplary embodiment; and FIG. 6 is a view of the configuration around a projection lens of a projector according to a second exemplary embodiment.

DETAILED DESCRIPTION OF THE PREFERRED EMBODIMENTS

Exemplary embodiments are described below with reference to the drawings where appropriate. It is noted that excessive details may not be described. For example, details of well known matters or repetitious description of substantially same configurations may not be provided in some cases. This is for avoiding unnecessary long description and for allowing those skilled in the art to easily understand the present technique.

The inventor(s) provides the accompanying drawings and the following description in order to help those skilled in the art to sufficiently understand the present disclosure, and does not intend to limit the subject matter recited in claims by means of these drawings or the description.

First Exemplary Embodiment

The first exemplary embodiment is described below with reference to FIGS. 1 to 5B.

[1-1. Configuration]
[1-1-1. Entire configuration]

Figure 1:
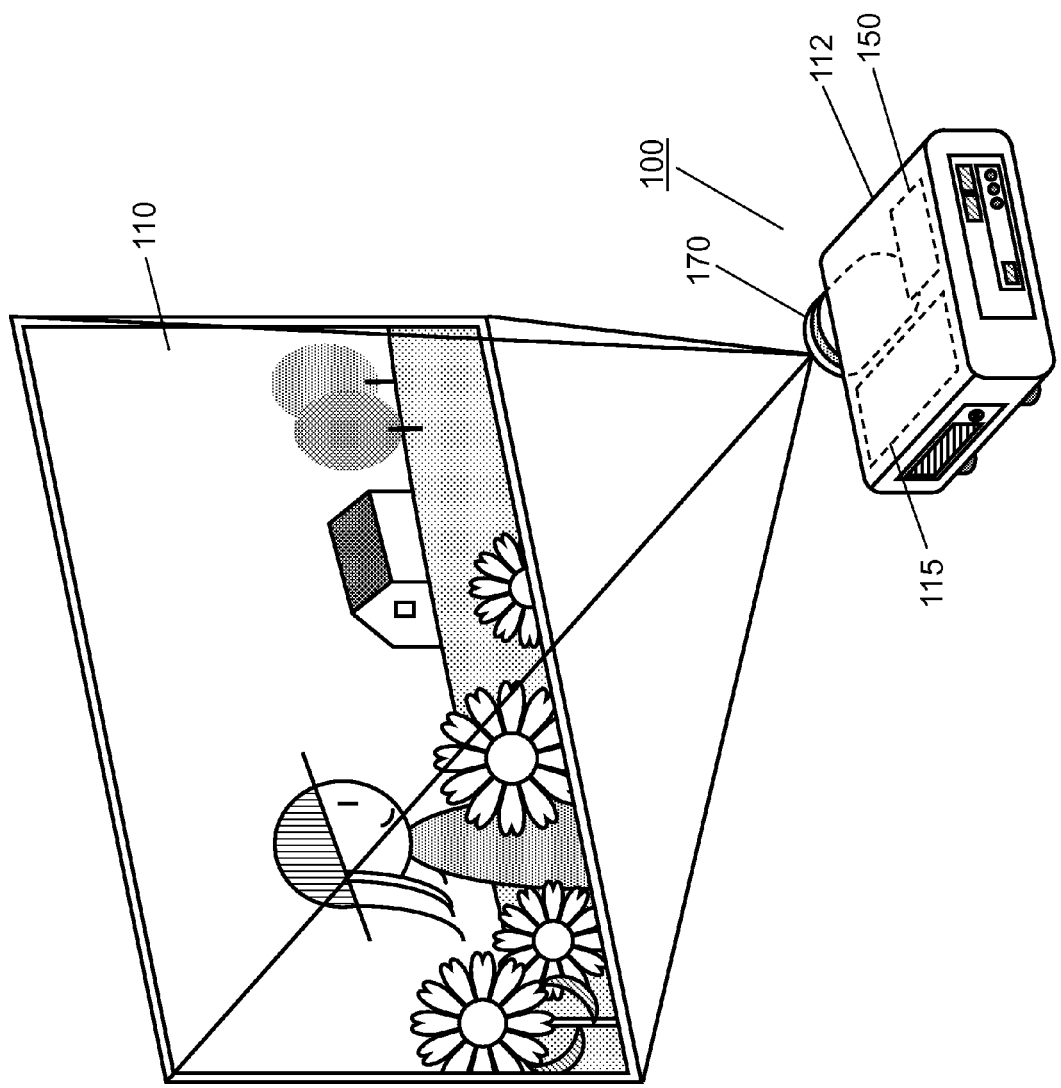
FIG. 1 is a perspective view of outer appearance, showing a state of use of a projector according to a first exemplary embodiment.

FIG. 1 is a perspective view of outer appearance, showing a state of use of projector 100. Projector 100 projects images on screen 110. Projector 100 includes exterior panel 112, lighting 115, image generator 150, and projection lens 170. Exterior panel 112 accommodates lighting 115, image generator 150, and projection lens 170. Projection lens 170 is partially exposed from an opening that is provided in a surface in a projection direction of exterior panel 112. Projector 100 exemplifies a projection display device.

Figure 2:
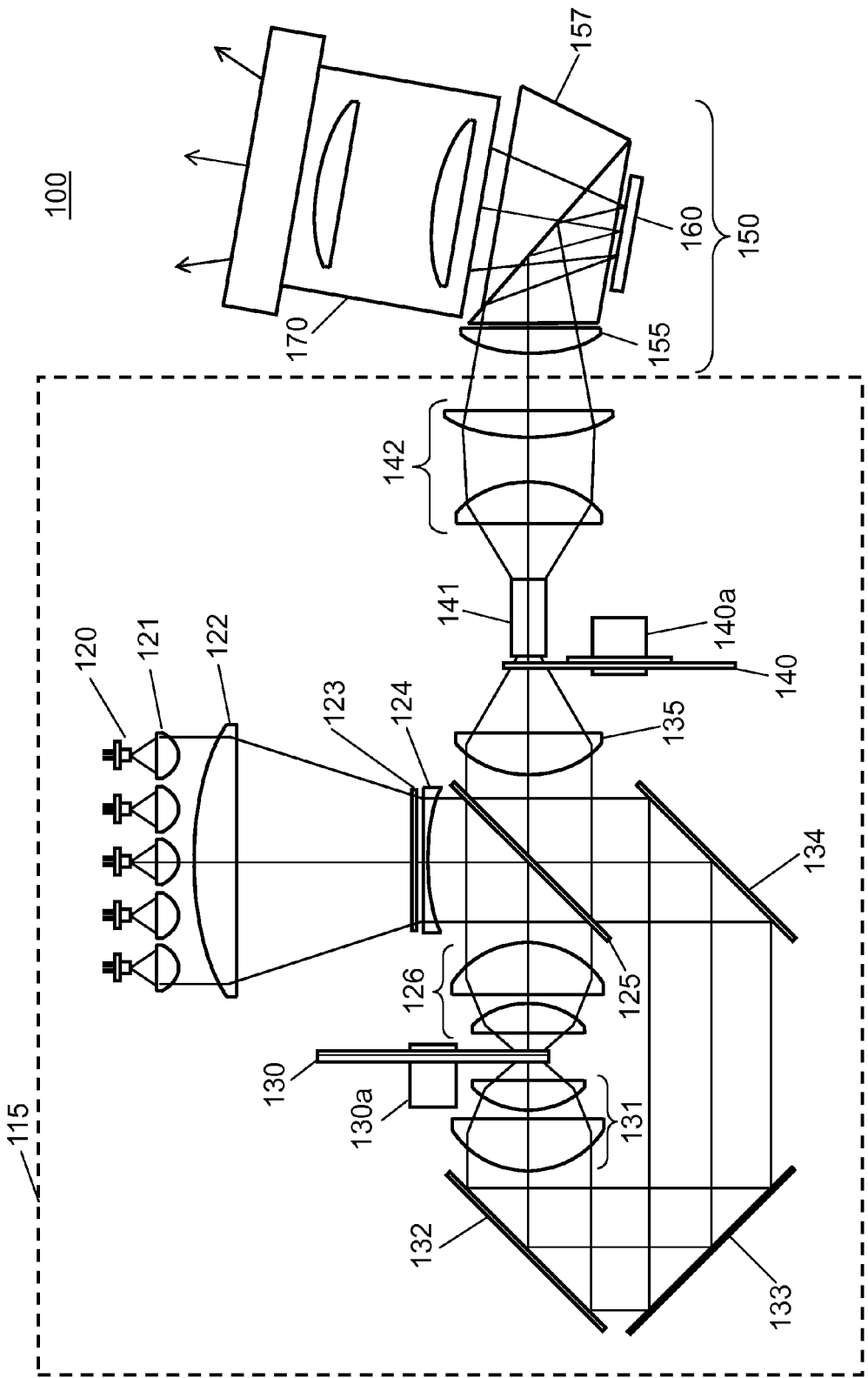
FIG. 2 is a view of the configuration of the projector according to the first exemplary embodiment.

FIG. 2 is a pattern view of the configuration of projector 100. Lighting 115 generates a red light beam, a green light beam, and a blue light beam used for generation of an image and emits the generated light beams to image generator 150. Image generator 150 generates an image using the respective color light beams generated by lighting 115 on the basis of an image signal transmitted from outside. The generated image is projected on screen 110 through projection lens 170.

Lighting 115 includes light source 120, collimate lens 121, condenser lens 122, diffuser 123, concave lens 124, dichroic mirror 125, condenser lens 126, phosphor wheel 130, relay lens 131, mirror 132, mirror 133, mirror 134, condenser lens 135, filter wheel 140, rod integrator 141, and relay lens 142. Light source 120 includes a plurality of laser light sources for emitting a blue light beam. Light source 120 emits a blue light beam. The blue light beam is transformed to a parallel light beam by collimate lens 121 and is then condensed toward diffuser 123 by condenser lens 122. Diffuser 123 appropriately diffuses the blue light beam and almost equalizes luminance distribution. Concave lens 124 transforms again the blue light beam having passed through diffuser 123 to a parallel light beam.

Dichroic mirror 125 reflects a blue light beam whereas allows light beams in other colors to pass therethrough. Dichroic mirror 125 reflects the blue light beam from concave lens 124 to change its travel direction by 90 degrees. Condenser lens 126 condenses the blue light beam from dichroic mirror 125 toward phosphor wheel 130.

Phosphor wheel 130 is rotated at predetermined angular velocity by motor 130a. Phosphor wheel 130 includes a red segment, a green segment, and a blue segment (not shown) divided by predetermined angles. The red segment is provided, at a light incident surface, with a phosphor excited by a blue light beam to emit a red light beam. The red segment emits a red light beam in an incident direction. The green segment is provided, at a light incident surface, with a phosphor excited by a blue light beam to emit a green light beam. The green segment emits a green light beam in the incident direction. The blue segment is provided with a through hole so as to allow an incident blue light beam to simply pass therethrough. Phosphor wheel 130 rotates to convert an incident blue light beam into a red light beam and a green light beam in accordance with time division.

The blue light beam having passed through phosphor wheel 130 is transformed to a parallel light beam by relay lens 131 and is then guided again to dichroic mirror 125 by mirror 132, mirror 133, and mirror 134. Dichroic mirror 125 reflects the blue light beam from mirror 134 so as to change its travel direction by 90 degrees.

Meanwhile, each of the red light beam and the green light beam excited by phosphor wheel 130 passes through condenser lens 126 reversely again so as to be transformed to a parallel light beam and enters dichroic mirror 125. Dichroic mirror 125 allows the incident red light beam and the incident green light beam to pass therethrough.

The blue light beam reflected by dichroic mirror 125 as well as the red light beam and the green light beam having passed through dichroic mirror 125 are parallel light beams having parallel optical axes, and enter condenser lens 135 in accordance with time division. Condenser lens 135 condenses the respective incident color light beams toward filter wheel 140.

Filter wheel 140 is rotated by motor 140a at the angular velocity equal to that of phosphor wheel 130. Filter wheel 140 includes a red segment, a green segment, and a blue segment (not shown) divided by predetermined angles. Phosphor wheel 130 and filter wheel 140 rotate with synchronized phases so that their segments in a same color correspond to each other. In other words, each of the color light beams from phosphor wheel 130 enters the segment in the same color of filter wheel 140. The red segment and the green segment serve as color filters that limit the ranges of passing wavelengths of the incident red light beam and the incident green light beam. The blue segment is made of transparent glass or the like and allows an incident blue light beam to simply pass therethrough.

The respective color light beams from filter wheel 140 enter rod integrator 141. Rod integrator 141 equalizes illuminance of an incident light beam and emits the equalized light beam. Relay lens 142 guides the light beam from rod integrator 141 to image generator 150.

Image generator 150 includes field lens 155, total internal reflection (TIR) prism 157, and digital micromirror device (DMD) 160. TIR prism 157 totally reflects an incident light beam having passed through field lens 155 to guide the reflected light beam to DMD 160. DMD 160 has a plurality of micromirrors that are located two-dimensionally on a plane. DMD 160 deflects the respective micromirrors in accordance with an image signal received by projector 100 in synchronization with the incident respective color light beams, so as to divide the respective color light beams into a light beam to enter projection lens 170, that is, an image, and a light beam to be reflected outward from the effective range of projection lens 170. The image passes through TIR prism 157 and enters projection lens 170. In this manner, an image is generated from a light beam having entered image generator 150.

Lastly, the generated image is projected on screen 110 through projection lens 170. Projection lens 170 is shiftable perpendicularly to the optical axis of an entering image. The projection direction of the image projected from projection lens 170 can be adjusted by shifting projection lens 170.

[1-1-2. Configuration Around Projection Lens]

FIG. 3 is a view of the configuration around projection lens 170 of projector 100. FIG. 3 includes a sectional view taken alonspacelane including the optical axis and parallel to an A-B direction, of projection lens 170 and its periphery, and a rear view thereof from backward in the direction of the optical axis (in the projection direction of an image). The A-B direction is defined to be perpendicular to the installation surface of projector 100 out of the directions perpendicular to the optical axis of projection lens 170. In the A-B direction, to an A side is defined as toward an upper surface of projector 100, whereas to a B side is defined as toward a bottom surface thereof. Hereinafter, the optical axis is assumed to mean the optical axis of projection lens 170. The optical axis has positional relationship fixed with respect to projection lens 170 and is displaced along with projection lens 170. Projection lens 170 is shiftable perpendicularly to the optical axis, and is thus shiftable also in the A-B direction. For convenience, description will be given below of a case where projection lens 170 shifts mainly in the A-B direction on the cross section in the figure.

Frame 200 is located inside exterior panel 112. Frame 200 has front surface 200b and regulator 200c. Front surface 200b has a rear face that includes at least a portion in contact with second dust-proof wall 220 and is perpendicular to the optical axis. In this case, a front face is defined as a face opposite to screen 110 on which an image is projected, whereas the rear face is defined as a face reverse to the front face. Front surface 200b has opening 200a. Opening 200a is defined as a substantially open portion. A substantially open portion means an open region in which projection lens 170 is substantially shiftable when projection lens 170 shifts in opening 200a. For example, if the opening has a rectangular shape and the projection lens has a circular cross section (unlike the present exemplary embodiment), the four corner regions in the rectangular shape are not included in the shiftable range of the projection lens. These regions are thus not included in the substantially open portion. A dimension of a portion adjacent to the opening is also defined as a dimension from an end of the substantially open portion. In the present exemplary embodiment, the substantially open portion is defined for convenience as being identical with the actual opening. Opening width D (to be described later) of opening 220a and width L (to be described later) of projection lens 170 are defined in the same manners. Opening 200a has opening width E in the A-B direction. As described above, opening 200a means the substantially open portion. The opening width is accordingly assumed to mean the width of the substantially open portion. More specifically, opening width E indicates a distance from the outer periphery on the A side in opening 200a when projection lens 170 shifts to the farmost position on the A side in opening 200a to the outer periphery on the B side in opening 200a when projection lens 170 shifts to the farmost position on the B side in opening 200a. Opening 200a exemplifies a first opening. Opening width E exemplifies a first opening width. Opening 200a in frame 200 and opening 112a in exterior panel 112 are located at the same position when viewed in the direction of the optical axis. Opening 112a in exterior panel 112 is shaped so as not to disturb shift of projection lens 170. Projection lens 170 is provided so as to be partially exposed from opening 200a in frame 200 and opening 112a in exterior panel 112. Projection lens 170 is shiftable in opening 200a in frame 200.

Regulator 200c is provided at the inner peripheral surface of a side surface of frame 200, and is in contact with the outer periphery of second dust-proof wall 220 (to be described later) of shield 205 so as to regulate the shiftable range. Although not shown, regulator 200c is provided so as to regulate the shiftable range of second dust-proof wall 220 in the A-B direction as well as the shiftable ranges of second dust-proof wall 220 in all of the shiftable directions.

Projection lens 170 is made freely shiftable on a plane perpendicular to the optical axis by an operation unit (not shown) connected to projection lens 170. In other words, projector 100 has a lens shift function. The A-B direction exemplifies a first axis direction.

Shield 205 shields a spacespace between frame 200 and projection lens 170. In other words, shield 205 and projection lens 170 shield opening 200a in frame 200. This configuration inhibits entry of foreign substances such as dust from outside to inside frame 200. The configuration including frame 200, shield 205, and regulator 200c exemplifies a housing for a projection display device.

Shield 205 has first dust-proof wall 210 and second dust-proof wall 220. First dust-proof wall 210 is made of sponge in a flat plate shape. First dust-proof wall 210 has an opening (not shown) penetrating from the front face to the rear face. First dust-proof wall 210 is located inside frame 200, more particularly, at the rear face of front surface 200b of frame 200, such that the front face is perpendicular to the optical axis. A portion of projection lens 170, where first dust-proof wall 210 is located, has a circular cross sectional shape perpendicular to the optical axis. The cross section has a width in the A-B direction, more particularly, distance L from the outer peripheral surface on the A side to the outer peripheral surface on the B side of the cross section of projection lens 170. Width L exemplifies a seventh width. The opening in first dust-proof wall 210 has the circular shape same as that of the cross sectional shape. The opening in first dust-proof wall 210 has an inner surface that is fixed so as to be in contact, without any spacespace, with the outer peripheral surface of projection lens 170. First dust-proof wall 210 has first dust-proof width a1 projecting from the outer peripheral surface of projection lens 170 to one side (to the A side in the figure) in the direction perpendicular to the optical axis, and first dust-proof width a2 projecting to the other side (to the B side in the figure). First dust-proof width a1 exemplifies the first width. First dust-proof width a2 exemplifies an eighth width.

Second dust-proof wall 220 is made of plastic in a flat plate shape. Second dust-proof wall 220 has opening 220a penetrating from the front face to the rear face. Opening 220a has opening width D in the A-B direction. Opening 220a exemplifies a second opening. Opening width D exemplifies a second opening width. Projection lens 170 is provided so as to penetrate opening 220a in second dust-proof wall 220. Second dust-proof wall 220 is located between front surface 200b of frame 200 and first dust-proof wall 210 in the direction of the optical axis and on the outer periphery of projection lens 170 such that the front face and the rear face are perpendicular to the optical axis. The front face of second dust-proof wall 220 is in contact with the rear face of front surface 200b without any spacespace. Furthermore, the rear face of second dust-proof wall 220 is in contact with the front face of first dust-proof wall 210 without any spacespace. In summary, from the side of screen 110 in the direction of the optical axis, front surface 200b of frame 200, second dust-proof wall 220, and first dust-proof wall 210 are located in close contact in this order.

Opening width D of opening 220a in second dust-proof wall 220 is larger than width L of the cross section perpendicular to the optical axis at a portion of projection lens 170, where the second dust-proof wall is located. Opening width D is smaller than opening width E of opening 200a in frame 200. Second dust-proof wall 220 can be thus located so as to have a spacespace from the outer periphery of projection lens 170. Second dust-proof wall 220 is slidable with respect to front surface 200b and first dust-proof wall 210 on the plane perpendicular to the optical axis within the range regulated by regulator 200c and the outer periphery of projection lens 170. Second dust-proof wall 220 is thus regarded as being slidable in the A-B direction.

The cross section in the figure includes distance f1 from the position of the end on the A side of the outer periphery of second dust-proof wall 220 having shifted to the farmost position on the A side within the range regulated by regulator 200c to the end on the A side of opening 200a in frame 200. Distance f1 indicates the shiftable range of second dust-proof wall 220 in the A-B direction when projection lens 170 is located at the farmost position on the A side. In this case, a distance from the position of the end on the A side of the outer periphery of second dust-proof wall 220 having shifted to the farmost position on the A side within the range regulated by regulator 200c to the end on the B side of opening 200a in frame 200 is equal to the sum of distance f1 and opening width E. Distance f1 exemplifies a sixth width.

Distance f2 is defined to be from the position of the end on the B side of the outer periphery of second dust-proof wall 220 having shifted to the farmost position on the B side within the range regulated by regulator 200c to the end on the B side of opening 200a in frame 200. Distance f2 indicates the shiftable range of second dust-proof wall 220 in the A-B direction when projection lens 170 is located at the farmost position on the B side. In this case, a distance from the position of the end on the B side of the outer periphery of second dust-proof wall 220 having shifted to the farmost position on the B side within the range regulated by regulator 200c to the end on the A side of opening 200a in frame 200 is equal to the sum of distance f2 and opening width E.

Second dust-proof wall 220 has second dust-proof width b1 of a portion on the A side with respect to projection lens 170, and second dust-proof width b2 of a portion on the B side with respect to projection lens 170. Second dust-proof width b1 exemplifies the second width.

For the purpose of easier description, assume that projection lens 170 is located at a first position and second dust-proof wall 220 is located at a second position. Assume that second dust-proof wall 220 is shiftable from the second position to the A side by distance c1 (the shiftable distance until coming into contact with regulator 200c), and is shiftable to the B side by distance c2 (the shiftable distance until coming into contact with regulator 200c). Assume that, in the spacespace in the A-B direction between the outer periphery of projection lens 170 and second dust-proof wall 220, a portion on the A side has distance d1, whereas a portion on the B side has distance d2. Assume that, in the spacespace in the A-B direction between the outer periphery of projection lens 170 and frame 200, a portion on the A side has distance e1, whereas a portion on the B side has distance e2. Distance c2 exemplifies a third width. Distance d1 exemplifies a fourth width. Distance e1 exemplifies a fifth width.

Distances c1, d1, e1, c2, d2, and e2 indicate dimensions of respective portions in the A-B direction on the cross section including the optical axis and parallel to the A-B direction when projection lens 170 and second dust-proof wall 220 are located at certain positions. These values vary as projection lens 170 and second dust-proof wall 220 shift. First dust-proof widths a1 and a2, second dust-proof widths b1 and b2, opening widths D and E, width L, and distances f1 and f2 indicate dimensions of respective portions defined upon designing projector 100, and have constant values regardless of the positions of projection lens 170 and second dust-proof wall 220.

In this case, even when projection lens 170 shifts to the B side, shield 205 is capable of shielding the spacespace between frame 200 and projection lens 170 under the following conditions. In projection lens 170, first dust-proof width a1 is not less than distance d1 (condition 1-1). Second dust-proof width b1 is not less than a length obtained by subtracting distance d1 from distance e1 (condition 2-1). A length obtained by subtracting distance e1 from the sum of second dust-proof width b1 and distance d1 is not less than distance c2 (condition 3-1).

Similarly, even when projection lens 170 shifts to the A side, shield 205 is capable of shielding the space between frame 200 and projection lens 170 under the following conditions. In projection lens 170, first dust-proof width a2 is not less than distance d2 (condition 1-2). Second dust-proof width b2 is not less than a length obtained by subtracting distance d2 from distance e2 (condition 2-2). A length obtained by subtracting distance e2 from the sum of second dust-proof width b2 and distance d2 is not less than distance c1 (condition 3-2).

Projector 100 is configured to satisfy these six conditions in the A-B direction. These conditions are expressed by the following equations.

$$a1 \geq d1 \quad \text{(Condition 1-1)}$$

$$b1 \geq e1 \geq d1 \quad \text{(Condition 2-1)}$$

$$b1+d1-e1 \geq c2 \quad \text{(Condition 3-1)}$$

$$a2 \geq d2 \quad \text{(Condition 1-2)}$$

$$b2 \geq e2-d2 \quad \text{(Condition 2-2)}$$

$$b2+d2-e2 \geq c1 \quad \text{(Condition 3-2)}$$

Condition 1-1 relates to a dimension that allows first dust-proof wall 210 having first dust-proof width a1 to shield the space (distance d1) between the outer periphery of projection lens 170 and second dust-proof wall 220. The same applies to condition 1-2.

Condition 2-1 relates to a dimension that allows first dust-proof wall 210 and second dust-proof wall 220 to shield the space (distance e1) between projection lens 170 and front surface 200b of frame 200. The substantially shieldable length obtained by combining first dust-proof wall 210 and second dust-proof wall 220 is equal to the sum of second dust-proof width b1 and distance d1. This is expressed as condition 2-1. The same applies to condition 2-2.

Condition 3-1 is described as follows. If second dust-proof wall 220 is located at the second position, the shiftable distance of second dust-proof wall 220 to the B side without any space being formed in the A-B direction between second dust-proof wall 220 and front surface 200b of frame 200 is obtained by subtracting distance e1 from the sum of second dust-proof width b1 and distance d1. Distance c2 is equal to the shiftable distance of second dust-proof wall 220 to the B side until coming into contact with regulator 200c of frame 200. Condition 3-1 relates to the dimension that prevents any space from being formed between second dust-proof wall 220 and front surface 200b of frame 200 when regulator 200c regulates the shiftable range of second dust-proof wall 220. The same applies to condition 3-2.

From a different perspective, even when projection lens 170 shifts to the B side, shield 205 is capable of shielding the space between frame 200 and projection lens 170 under the following conditions. An outer diameter of second dust-proof wall 220 in the A-B direction, more particularly, the sum of second dust-proof width b1, second dust-proof width b2, and opening width D is not less than the sum of distance f1 and opening width E (condition 4-1). Furthermore, the sum of width L of projection lens 170 and first dust-proof width a2 is not less than opening width D (condition 5-1).

Similarly, even when projection lens 170 shifts to the A side, shield 205 is capable of shielding the space between frame 200 and projection lens 170 under the following conditions. The outer diameter of second dust-proof wall 220 in the A-B direction, more particularly, the sum of second dust-proof width b1, second dust-proof width b2, and opening width D is not less than the sum of distance f2 and opening width E (condition 4-2). Furthermore, the sum of width L of projection lens 170 and first dust-proof width a1 is not less than opening width D (condition 5-2).

Projector 100 is configured to satisfy these four conditions in the A-B direction. These conditions are expressed by the following equations.

$$b1+b2+D \geq f1+E \quad \text{(Condition 4-1)}$$

$$L+a2 \geq D \quad \text{(Condition 5-1)}$$

$$b1+b2+D \geq f2+E \quad \text{(Condition 4-2)}$$

$$L+a1 \geq D \quad \text{(Condition 5-2)}$$

In other words, even when projection lens 170 shifts in the A-B direction, shield 205 is capable of shielding the space between frame 200 and projection lens 170 if all of conditions 4-1, 5-1, 4-2, and 5-2 are satisfied.

Projector 100 is configured so as to satisfy conditions similar to the above in all of the shiftable directions of projection lens 170. Accordingly, regardless of the positions of the projection lens 170 and second dust-proof wall 220 within the shiftable ranges, there is formed no space in the direction perpendicular to the optical axis between second dust-proof wall 220 and front surface 200b of frame 200. Furthermore, there is formed no space in the direction perpendicular to the optical axis between second dust-proof wall 220 and first dust-proof wall 210. Accordingly, second dust-proof wall 220 is configured to shield the space between first dust-proof wall 210 and frame 200 regardless of the position of projection lens 170. Shield 205 shields the space between frame 200 and projection lens 170. In other words, shield 205 and projection lens 170 shield opening 200a in frame 200.

[1-2. Operation]

[1-2-1. Lens Shift Operation]

FIG. 4 is a view of the configuration around projection lens 170 of projector 100. Similarly to FIG. 3, FIG. 4 includes a sectional view taken along a plane including the optical axis, of projection lens 170 and its periphery, and a rear view thereof from backward in the direction of the optical axis.

While FIG. 3 shows the state where projection lens 170 is located substantially at the center in the shiftable range, FIG. 4 shows the state where projection lens 170 shifts to the end on the A side within the shiftable range.

With reference to FIG. 4, description will be given below of the state where projection lens 170 performs lens shift from the state shown in FIG. 3 so as to shift on the plane perpendicular to the optical axis.

Projection lens 170 having the lens shift function is freely shiftable on the plane perpendicular to the optical axis.

FIG. 4 shows the state where projection lens 170 performs lens shift to the A side (upward from the installation surface of projector 100) until coming into contact with front surface 200b of frame 200 (to the end of opening 200a). Distance e1 is thus equal to 0 (mm). It is noted that the present exemplary embodiment exemplifies the case where the width of front surface 200b is equal to second dust-proof width b2 of second dust-proof wall 220. Accordingly, when projection lens 170 is located so as to be in contact with front surface 200b in the cross section shown in FIG. 4, second dust-proof wall 220 is in contact with both regulator 200c and the outer periphery of projection lens 170.

First dust-proof widths a1 and a2, second dust-proof widths b1 and b2, distances c1, c2, d1, d2, e1, and e2 are configured so as to satisfy the conditions described above. Accordingly, even when projection lens 170 performs lens shift to the A side until coming into contact with front surface 200b of frame 200, opening 200a in frame 200 can be shielded by projection lens 170 and shield 205.

[1-3. Effects]

The configuration described above is capable of inhibiting entry of dust and the like through opening 200a in frame 200. In comparison to a case where a shield is configured by a single dust-proof wall, the shiftable distance of projection lens 170 can be kept equally while projector 100 can be reduced in size. Alternatively, the shiftable distance of projection lens 170 can be extended while projector 100 is unchanged in size.

With reference to FIGS. 5A and 5B, description will be given below of reasons for the effects.

FIGS. 5A and 5B each illustrate the effects of projector 100 according to the present exemplary embodiment. FIG. 5A is a view showing the relationship between projection lens 170 and frame 200 in a case where a shield is configured by single dust-proof wall 820. In FIG. 5A, dust-proof wall 820 has dust-proof width b'1 on the A side and dust-proof width b'2 on the b side. Dust-proof wall 820 has shiftable distance c'1 from a certain position (third position) to the A side. Dust-proof wall 820 has shiftable distance c'2 from the third position to the B side. Assume that the space in the A-B direction between the outer periphery of projection lens 170 and frame 200 has distance e'1 on the A side. Assume that the space in the A-B direction between the outer periphery of projection lens 170 and frame 200 has distance e'2 on the B side.

FIG. 5B is a view showing the relationship between projection lens 170 and frame 200 in the case where shield 205 is configured by two dust-proof walls, namely, first dust-proof wall 210 and second dust-proof wall 220, as in the present exemplary embodiment.

In the configuration including the single dust-proof wall as shown in FIG. 5A, frame 200 is protected from dust, more particularly, dust-proof wall 820 shields the space between frame 200 and projection lens 170 within the shiftable range of projection lens 170 under the following conditions.

$$e'1+e'2 \leq b'1$$

$$e'1+e'2 \leq b'2$$

Meanwhile, in FIG. 5B, frame 200 is protected from dust, more particularly, shield 205 shields the space between frame 200 and projection lens 170 within the shiftable range of projection lens 170 under the following conditions.

$$e1+e2 \leq d1+d2+b1$$

$$e1+e2 \leq d1+d2+b2$$

Description is given while particular values are applied. There are obtained necessary lengths b'2 and b2 under the following conditions.

$$e'1=e1=e'2=e2=20 \text{ (mm)}$$

(More particularly, e1+e2=40 (mm), e'1+e'2=40 (mm))

$$d1+d2=10 \text{ (mm)}$$

In order to satisfy the conditions described earlier with the above values, dust-proof widths b'1 and b'2 need to be not less than 40 (mm). Second dust-proof widths b1 and b2 need to be not less than 30 (mm). Second dust-proof widths b1 and b2 can be thus shorter than dust-proof widths b'1 and b'2.

In comparison to the case where the shield is configured by a single dust-proof wall, when the shield includes the two dust-proof walls as in the present exemplary embodiment, the shiftable distance of projection lens 170 can be kept equally while projector 100 can be reduced in size. Alternatively, the shiftable distance of projection lens 170 can be extended while projector 100 is unchanged in size. In projection lens 170 provided so as to be partially exposed from opening 200a in frame 200, first dust-proof wall 210 and second dust-proof wall 220 are capable of inhibiting entry of dust and the like into frame 200. It is thus possible to suppress deterioration in optical transmittance due to entry of dust.

[1-4. Conclusion]

A housing for a projection display device according to the present exemplary embodiment includes frame 200 that has opening 200a in which projection lens 170 is located so as to be shiftable in the A-B direction, shield 205 that is shiftable in the A-B direction with respect to frame 200 and shields opening 200a along with projection lens 170, and regulator 200c that regulates shift of shield 205. Shield 205 has first dust-proof wall 210 and second dust-proof wall 220. First dust-proof wall 210 is located so as to be in contact with the outer periphery of projection lens 170, is shiftable integrally with projection lens 170, and has first dust-proof width a1 projecting from the outer periphery of projection lens 170 to the A side in the A-B direction. Second dust-proof wall 220 is located between opening 200a and first dust-proof wall 210 so as to have a space from the outer periphery of projection lens 170, is slidable in the A-B direction within the range regulated by regulator 200c, and has second dust-proof width b1 defined as the length of the portion on the A side. When projection lens 170 is located at the first position and second dust-proof wall 220 is located at the second position, distance c2 is defined as the shiftable length of second dust-proof wall 220 from the second position to the B side with respect to projection lens 170, distance d1 is defined as the length of the portion on the A side in the space between the outer periphery of projection lens 170 and second dust-proof wall 220, and distance e1 is defined as the length of the portion on the A side in the space between the outer periphery of projection lens 170 and frame 200. In this case, first dust-proof width a1 is not less than distance d1, second dust-proof width b1 is not less than the length obtained by subtracting distance d1 from distance e1, and the length obtained by subtracting distance e1 from the sum of second dust-proof width b1 and distance d1 is not less than distance c2.

A housing for a projection display device according to the present exemplary embodiment includes frame 200 that has opening 200a in which projection lens 170 is located so as to be shiftable in the A-B direction, shield 205 that is shiftable in the A-B direction with respect to frame 200 and shields opening 200a along with projection lens 170, and regulator 200c that regulates shift of shield 205. Shield 205 has first dust-proof wall 210 and second dust-proof wall 220. First dust-proof wall 210 is located so as to be in contact with the outer periphery of projection lens 170, is shiftable integrally with projection lens 170, and has first dust-proof width a2 projecting from the outer periphery of projection lens 170 to the B side in the A-B direction. Second dust-proof wall 220 is located between opening 200a and first dust-proof wall 210, has opening 220a in which projection lens 170 is located, is slidable in the A-B direction within the range regulated by regulator 200c. Opening 200a has opening width E in the A-B direction, and opening 220a has opening width D in the A-B direction. Distance f1 is defined as the distance from the position of the end on the A side of the outer periphery of second dust-proof wall 220 having shifted to the farmost position on the A side within the range regulated by regulator 200c to the end on the A side of opening 200a. Projection lens 170 has width L in the A-B direction. In this case, the outer diameter of second dust-proof wall 220 in the A-B direction is not less than the sum of distance f1 and opening width E, whereas the sum of width L and first dust-proof width a2 is not less than opening width D.

The configuration described above is capable of inhibiting entry of dust and the like through opening 200a in frame 200. Furthermore, the shiftable distance of projection lens 170 can be kept equally while projector 100 can be reduced in size. Alternatively, the shiftable distance of projection lens 170 can be extended while projector 100 is unchanged in size. Consequently, the housing for a projection display device is relatively small in size and is capable of protecting the inside of the housing from dust.

Second Exemplary Embodiment

[2-1. Outline]

The second exemplary embodiment is described below with reference to FIG. 6. FIG. 6 is a view of the configuration around a projection lens of a projector according to the second exemplary embodiment.

The first exemplary embodiment exemplified the case where second dust-proof wall 220 slides while being regulated by regulator 200c of frame 200. The second exemplary embodiment exemplifies a case where second dust-proof wall 620 slides while being regulated by regulator 630. Other configurations and operation are similar to those of the first exemplary embodiment and thus are not described repeatedly.

A housing for a projection display device according to the second exemplary embodiment includes second dust-proof wall 620 in place of second dust-proof wall 220.

Second dust-proof wall 620 is made of plastic in a flat plate shape, and has opening 620a penetrating from the front face to the rear face. Second dust-proof wall 620 is provided, at each side surface, with cutout 635. Projection lens 170 is provided so as to penetrate opening 620a in second dust-proof wall 620. Second dust-proof wall 620 is located between front surface 200b of frame 200 and first dust-proof wall 210 in the direction of the optical axis and on the outer periphery of projection lens 170. The front face of second dust-proof wall 620 is in contact with the rear face of front surface 200b without any space. Furthermore, the rear face of second dust-proof wall 620 is in contact with the front face of first dust-proof wall 210 without any space. More particularly, second dust-proof wall 620 is provided so as to shield the space between first dust-proof wall 210 and frame 200.

Regulator 630 is a columnar projection projecting parallelly to the optical axis and is connected to frame 200. Regulator 630 is made of metal, resin, or the like.

In the present exemplary embodiment, when second dust-proof wall 620 slides along with lens shift, cutout 635 is made in contact with regulator 630. Shift of second dust-proof wall 620 is thus regulated by regulator 630. Second dust-proof wall 620 has shiftable distance c1 from the position indicated in the figure to the A side with respect to projection lens 170, for example (shiftable distance until coming into contact with regulator 630). Similarly, second dust-proof wall 620 has shiftable distance c2 to the B side with respect to projection lens 170 (shiftable distance until coming into contact with regulator 630).

In projector 100 according to the first exemplary embodiment, the shiftable range of second dust-proof wall 220 is regulated because regulator 200c provided at the inner peripheral surface of frame 200 comes into contact with the outer periphery of second dust-proof wall 220. To the contrary, in the second exemplary embodiment, the shiftable range of second dust-proof wall 620 is regulated because regulator 630 provided not at the inner periphery of frame 200 comes into contact with cutout 635 in second dust-proof wall 620. This configuration does not require regulation by the regulator provided at the inner periphery of frame 200. This enhances flexibility in design of frame 200, as well as the exterior panel accommodating frame 200.

(Other Exemplary Embodiments)

The first and second exemplary embodiments have been described above in order to exemplify the technique disclosed in the present application. The technique according to the present disclosure is not limited to the above but is applicable to any other exemplary embodiment obtained by modification, replacement, addition, removal, and the like where appropriate.

Other embodiments are thus collectively described below.

The first exemplary embodiment exemplified the case where first dust-proof wall 210 is made of sponge. First dust-proof wall has only to be located so as to be in contact with the outer periphery of the projection lens, be shiftable integrally with the projection lens, and shield the opening in the frame along with the projection lens and the second dust-proof wall. For example, the first dust-proof wall can be made of resin or the like. First dust-proof wall 210 and projection lens 170 can be stuck to each other with an adhesive. Outer periphery of first dust-proof wall 210 can be provided integrally with another first dust-proof wall.

The first exemplary embodiment exemplified the case where frame 200 is made of a material different from that of exterior panel 112. Alternatively, the frame and the exterior panel can be provided integrally with each other. Still alternatively, the regulator and the exterior panel can be provided integrally with each other.

According to the first exemplary embodiment, first dust-proof wall 210 and second dust-proof wall 220 each have the shape surrounding projection lens 170, more particularly, the annular shape. In accordance with the shiftable range of the projection lens in a certain direction, the necessary width of a dust-proof wall in the direction varies. In a configuration in which the projection lens does not shift in a direction, the other portions can be configured appropriately so as to eliminate the width of the dust-proof wall in the direction, in other words, to form the dust-proof wall into a non-annular shape provided with a cutout at the portion.

The exemplary embodiment has been described above in order to exemplify the technique in the present disclosure. The accompanying drawings and the detailed description have been provided for this purpose.

In order to exemplify the technique, the constituent elements depicted in the accompanying drawings and described in the detailed description may include unessential constituent elements for achieving the object in addition to the constituent elements essential for achieving the object. It should not readily regard the unessential constituent elements as being essential just because these unessential constituent elements are depicted in the accompanying drawings or described in the detailed description.

The exemplary embodiment described above exemplifies the technique in the present disclosure, and thus can be modified, replaced, added, and removed in various manners within the scope of the claims or equivalents thereof.

The technique according to the present disclosure is applicable to a projection display device such as a projector.

What is claimed is:

1. A housing for a projection display device, the housing comprising:
   a frame having an opening in which a projection lens is located so as to be shiftable in a first axis direction;
   a shield shiftable in the first axis direction with respect to the frame, for shielding the opening along with the projection lens; and
   a regulator for regulating shift of the shield;
   wherein the shield includes:
   a first dust-proof wall that is located so as to be in contact with an outer periphery of the projection lens, is shiftable integrally with the projection lens, and has a first width projecting from the outer periphery of the projection lens to a first side in the first axis direction, and
   a second dust-proof wall that is located between the opening and the first dust-proof wall so as to have a space from the outer periphery of the projection lens, is slidable in the first axis direction within a range regulated by the regulator, and has a second width corresponding to a length of a portion on the first side;
   wherein when the projection lens is located at a first position and the second dust-proof wall is located at a second position, assuming that the second dust-proof wall has a third width corresponding to a length shiftable from the second position to a second side opposite to the first side with respect to the projection lens, a fourth width corresponding to a length of a portion on the first side in the space between the outer periphery of the projection lens and the second dust-proof wall, and a fifth width corresponding to a length of a portion on the first side in a space between the outer periphery of the projection lens and the frame,
   the first width is not less than the fourth width,
   the second width is not less than a length obtained by subtracting the fourth width from the fifth width, and
   a length obtained by subtracting the fifth width from a sum of the second width and the fourth width is not less than the third width.

2. The housing for a projection display device according to claim 1, wherein the regulator is provided at the frame.

3. The housing for a projection display device according to claim 1, wherein the first axis direction is perpendicular to an optical axis of the projection lens.

4. A projection display device comprising the housing for a projection display device according to claim 1.

5. A housing for a projection display device, the housing comprising:
   a frame having a first opening in which a projection lens is located so as to be shiftable in a first axis direction;
   a shield shiftable in the first axis direction with respect to the frame, for shielding the first opening along with the projection lens; and
   a regulator for regulating shift of the shield;
   wherein the shield includes:
   a first dust-proof wall that is located so as to be in contact with an outer periphery of the projection lens, is shiftable integrally with the projection lens, and has an eighth width projecting from the outer periphery of the projection lens to a second side opposite to a first side in the first axis direction, and
   a second dust-proof wall that is located between the first opening and the first dust-proof wall, has a second opening in which the projection lens is located, and is slidable in the first axis direction within a range regulated by the regulator;
   wherein assuming that the first opening has a first opening width in the first axis direction, the second opening has a second opening width in the first axis direction, a sixth width is a distance from a position of an end on the first side of an outer periphery of the second dust-proof wall having shifted to a farmost position on the first side within the range regulated by the regulator to an end on the first side of the first opening, and the projection lens has a seventh width in the first axis direction,
   the second dust-proof wall has an outer diameter in the first axis direction not less than a sum of the sixth width and the first opening width, and
   a sum of the seventh width and the eighth width is not less than the second opening width.

6. A projection display device comprising the housing for a projection display device according to claim 5.

* * * * *